Patented Nov. 18, 1947

2,430,865

UNITED STATES PATENT OFFICE 2,430,865

NAPHTHENE PEROXIDES

Adalbert Farkas and Arthur F. Stribley, Jr., Long Beach, Calif., assignors to Union Oil Company of California, Los Angeles, Calif., a corporation of California No Drawing. Application February 17, 1944, Serial No. 522,840

3 Claims. (Cl. 260—610)

This invention relates to naphthene peroxides and more particularly to naphthene hydroperoxides, to methods of producing such peroxides by the liquid phase oxidation of naphthene hydrocarbons with an oxygen-containing gas and to the utilization of such peroxides.

In many oxidation processes and particularly in liquid phase, air or oxygen-containing gas oxidation processes for the production of partial oxidation products from hydrocarbon feeds the presence of peroxides has been observed. However, no attempt has heretofore been made to isolate such peroxides of saturated hydrocarbons nor has any attempt been made to produce and isolate peroxides of saturated hydrocarbons as the primary oxidation product of hydrocarbons. This has been due to the fact that such peroxides are relatively unstable at elevated temperatures and decompose and/or become further oxidized readily under the conditions of oxidation usually employed so that the concentrations of peroxides in a hydrocarbon or hydrocarbon mixture undergoing oxidation is usually low.

It is an object of our invention to provide a method for the controlled oxidation of hydrocarbons to produce a substantial proportion of hydrocarbon peroxides.

It is another object of our invention to provide a method for the treatment of a hydrocarbon to produce a substantial proportion of hydrocarbon peroxides without producing appreciable quantities of other partial oxidation products.

It is also an object of our invention to produce substantially pure naphthene hydroperoxides as new products.

It is a further object of our invention to provide a new and improved method for the production of peroxides of cyclic hydrocarbons from said cyclic hydrocarbons by a process involving contacting said cyclic hydrocarbons with an oxygen-containing gas.

It is a more specific object of our invention to produce cyclic or naphthene hydrocarbon hydroperoxides by a process involving oxidation of naphthene hydrocarbons in the liquid phase by contacting said hydrocarbons with an oxygen-containing gas under conditions such that peroxides are produced in a substantial amount and that the production of other partial oxidation products is minimized.

It is a particular object of our invention to provide an efficient method for separating hydrocarbon peroxides from other partial oxidation products of hydrocarbons.

It is a still further object of our invention to provide an oil-soluble peroxides concentrate or a relatively pure oil-soluble peroxide which has value as an initiator, accelerator or catalyst for oxidation or polymerization processes and which has particular value as an improver for Diesel fuel.

Other objects, features and advantages will be apparent from the following description of our invention.

We have found that the oxidation of naphthene hydrocarbons to form peroxides of the hydroperoxide type takes place readily and can be accomplished by contacting naphthene hydrocarbons with an oxygen-containing gas, for example, air, oxygen, or air enriched with oxygen, in the liquid phase. The peroxides which are produced have the formula R.OOH, where R is a naphthene ring containing four to eight carbon atoms in the ring with or without one or more organic substituents attached to the ring or where R is a saturated condensed ring grouping with or without one or more organic substituents attached to the condensed ring nucleus. The organic substituents may be alkyl, cycloalkyl, aralkyl, or aryl radicals or combinations of these radicals.

Hydrocarbons which we may oxidize by our process include cyclopropane, cyclobutane, cyclopentane, cyclohexane, cycloheptane, cyclooctane and the various mono-, di-, tri-, and poly substituted saturated cyclic hydrocarbons in which the substituent groups may be methyl, ethyl, propyl, isopropyl, butyl, isobutyl, tertiary butyl, etc., alkyl radicals, for example, methylcyclopentane, dimethylcyclopentanes, ethylcyclopentane, diethylcyclopentanes, trimethylcyclopentanes, etc., and the various isomers of these substituted cyclopentanes and similar substituted cyclohexanes, cycloheptanes, etc. The substituents may also be cycloalkyl, aralkyl, aryl or combinations of two or more of these radicals or one or more alkyl radicals with one or more of these radicals. Thus compounds such as cyclopentylcyclohexane, benzylcyclopentane, phenylcyclohexane, etc., may be employed. We also use as oxidation feed condensed ring naphthenes, such as bicyclo-(0,1,4)-heptane, bicyclo-(0,2,4)-octane, bicyclo-(1,2,3)-octane, bicyclo-(1,1,3)-heptane, bicyclo-(0,1,3)-hexane, bicyclo-(0,2,2)-hexane, indane, decahydronaphthalene, dodecahydrofluorene, tetradecahydroanthracene, tetradecahydrophenanthrene, decahydroacenaphthene and the various substituted condensed ring naphthenes in which the substituent groups may be alkyl, aralkyl, cycloalkyl, aryl or combinations of two or more of these groups.

While we may use any and all of the naphthene hydrocarbons as indicated hereinabove, we prefer to use those naphthene hydrocarbons having at least one substituent group since we have found for example that the alkyl substituted cyclobutanes, pentanes, hexanes, heptanes and octanes all oxidize more readily and yield peroxides in relatively greater proportions than do the corresponding unsubstituted naphthenes, i. e., the cyclobutane, cyclopentane, etc. The ease with which the substituted cyclic hydrocarbons oxidize to produce hydroperoxides indicates that the presence of a tertiary hydrogen atom facilitates peroxide formation and it is believed that the peroxide group, i. e., the —OOH— group replaces a tertiary hydrogen more readily than a secondary hydrogen and that in the case of methyl-cyclopentane, for example, the hydroperoxide group probably enters the ring at the carbon to which the methyl group is attached. The desired reaction which we obtain by our method of oxidation does not alter the chemical structure of the hydrocarbon, i. e., ring cleavage does not occur so that the carbon skeleton of the hydroperoxide is the same as the carbon skeleton of the naphthene hydrocarbon from which the peroxide is produced.

In addition to naphthenes, as indicated above, we may use as the oxidation feed mixtures of two or more naphthenes or we may use hydrocarbon fractions rich in naphthenes. Thus fractions of straight-run gasolines containing appreciable proportions of naphthene hydrocarbons respond to our oxidation treatment to yield relatively large proportions of naphthene peroxides and under the conditions of oxidation employed little or no reaction is obtained with the other hydrocarbons present in these fractions such as the paraffin and aromatic hydrocarbons. Thus fractions of straight-run gasoline containing in the order of about 35% or more of naphthene hydrocarbons which may or may not contain aromatic hydrocarbons, the remaining constituents being paraffinic hydrocarbons, and very desirable oxidation feeds. Although small percentages of aromatic hydrocarbons, i. e., up to about 10% in the oxidation feed are not seriously objectionable, we prefer to employ an aromatic-free or substantially aromatic-free feed such as one containing less than about 5% and preferably less than about 2% of aromatic hydrocarbons. Again, although the oxidation feed may contain small proportions of olefinic hydrocarbons we prefer to use a feed containing less than about 5% olefins and preferably less than about 2% of olefins. Moreover, we prefer to oxidize a fraction having a relatively narrow boiling point range, i. e., in the order of from 50° F. or preferably 10° F. to 15° F. or even less in some instances since the products from the oxidation of such narrow boiling hydrocarbon fractions are more readily resolved into substantially pure peroxide compounds. For some uses it is not essential that substantially pure peroxides be separated i. e., when the peroxides are to be used in a Diesel fuel composition and in these instances the oxidation feed may have a wider boiling range such as in the order of 100° F. or even greater without seriously impairing the oxidation and recovery process.

Peroxides which we may produce by our process in good yields and in substantially pure form include cyclopentyl hydroperoxide, the isomeric dimethylcyclopentyl hydroperoxides, ethylcyclopentyl hydroperoxide, the isomeric diethylcyclopentyl hydroperoxides, the isomeric methylethylcyclopentyl hydroperoxides, cyclohexyl hydroperoxide, methylcyclohexyl hydroperoxide, the dimethylcyclohexyl hydroperoxides, ethylcyclohexyl hydroperoxide, and the three isomeric diethylcyclohexyl hydroperoxides, the isomeric methylethylcyclohexyl hydroperoxides, 1-4 methylisopropylcyclohexyl hydroperoxide, as well as the corresponding derivatives of cyclobutane, cycloheptane, etc., and the higher molecular weight substituted cycloparaffins.

The method of carrying out the oxidation to produce naphthene peroxides comprises heating the naphthene hydrocarbon to an elevated temperature such as about 250° F. to about 275° F. and blowing air or other gas containing free oxygen into the heated hydrocarbon until the peroxide content of the charge reaches the desired value. When this point has been reached the charge is removed from the oxidation vessel and treated for the recovery of peroxide as described hereinbelow. While we may operate at any temperature high enough to cause the hydrocarbon molecule to combine with oxygen, such as above about 150° F. we have found that temperatures in the order of 200° F. to 325° F. or preferably between about 240° F. and 300° F., are particularly desirable. We may oxidize at ordinary atmospheric pressure or at superatmospheric pressures, such as up to about 500 pounds per square inch gage, however, we prefer to operate at pressures in the order of between about 50 and 150 pounds per square inch gage. The pressure employed in any given case will depend upon the particular hydrocarbon or hydrocarbon fraction being oxidized, upon its boiling point and upon its ease of oxidation for, as is known, other factors remaining constant, the higher the pressure the more rapid will be the oxidation. When oxidizing the lower molecular weight naphthene hydrocarbons, such as methylcyclopentane, it is particularly convenient to operate under superatmospheric pressure in order to prevent volatilization of the hydrocarbon. The rate of air-blowing may be varied widely and will depend upon the utilization of oxygen present in the air or oxygen containing gas. Thus sufficient air or other oxidizing gas should be supplied to effect the oxidation in a reasonable period of time. It is preferable that the air be distributed or dispersed in fine bubbles in the liquid hydrocarbon since the efficiency of oxygen utilization depends to a great extent upon the degree of dispersion of the air in the liquid. In those cases in which the oxidation is carried out under superatmospheric pressure the exit gases from the oxidation vessel may be enriched with additional quantities of fresh air or oxygen and recycled to the oxidation vessel and in this manner the percentage of oxygen in the oxidizing gas may be maintained at a relatively high value without seriously reducing the efficiency of the process from the point of view of compressing large quantities of air, the oxygen content of which is not efficiently utilized in each cycle.

The proportion of peroxide in the oxidized product may be varied depending upon the conditions and the time of oxidation and we may produce hydrocarbon mixtures containing up to about 25% by weight of peroxides or even higher. Thus we may produce a product containing from about 1% to about 25% by weight of peroxide although the percentage will depend upon the particular stock being oxidized since there appears to be a variation with different hydrocarbon feeds in the relative rates of production of peroxides on the one hand and other partial oxidation products on the other.

In those cases in which the peroxides are removed from the oxidate as a peroxide concentrate or as a substantially pure peroxide the residue or the mixture of hydrocarbon and partially oxidized hydrocarbon remaining after the removal of peroxide may be further oxidized to produce more peroxide. It may be treated alone or after mixing it with additional quantities of new feed, such as enough new feed to make up the volume losses incurred during the oxidation and recovery processes. This residue is particularly good oxidation feed because it contains some peroxides which, as pointed out hereinbelow, are oxidation accelerators and/or initiators.

The type of oxidation process referred to above is a batch operation and while this method is highly satisfactory for the production of our peroxides, it is less efficient than a continuous type of operation which may be effected by oxidizing a naphthene hydrocarbon or hydrocarbon fraction containing naphthene hydrocarbons until the peroxide content has reached the desired value, at which time portions of the oxidized hydrocarbon are continuously withdrawn from the oxidation vessel, treated for the removal of peroxides, and returned to the oxidation vessel together with sufficient new or unoxidized hydrocarbon feed to maintain an approximately constant liquid level in the oxidation vessel. In this type of operation peroxides are always present in the charge being oxidized and the rate of peroxide formation is readily maintained at a high level.

Although we may effect the oxidation without the use of oxidation initiators, accelerators, catalysts, etc., we prefer to use a peroxide, such as a peroxide produced in the operation as an initiator or accelerator, as indicated hereinabove for subsequent operations. Thus in a batch oxidation or in starting a continuous oxidation process the addition of small amounts of naphthene peroxides to the naphthene hydrocarbon to be oxidized materially increases the rate of peroxide formation in the new charge. As described hereinbelow the removal of peroxides from the oxide by the various extraction and chemical processes is not complete. Depending upon the method employed, the treated oxidate will contain from a few tenths of one per cent to 2% or even 3% of peroxides, more complete removal being uneconomical in any given case.

In addition to the use of naphthene peroxides as initiators or accelerators we may also use metallic catalysts, such as oil-soluble metal salts, i. e., naphthenates of iron or manganese or the like, and also metal salts of inorganic acids, such as copper chloride or copper sulfate.

As mentioned hereinabove, we prefer to operate under conditions such that the formation of peroxides takes place with the minimum production of other partial oxidation products and particularly with the minimum production of acidic oxidation products since it is known that these acidic products catalyze the decomposition of peroxides. Thus it is found that in oxidizing, for example, a gasoline fraction rich in dimethylcyclopentane, the percentage of peroxides in the partially oxidized mixture reaches a maximum of about 10% to as high as 25% by weight and if the oxidation is continued for a longer period of time the percentage of peroxides is found to decrease. Concurrently the percentage of acids increases slowly until the peroxide content has reached a maximum and then increases far more rapidly. There is, therefore, in any given case a limit to which the oxidation can be economically carried when peroxides are the desired product. This limit, it should be pointed out, depends upon the particular hydrocarbon or hydrocarbon mixture being oxidized and also upon the conditions under which the oxidation is effected.

In some instances we may prefer to effect the oxidation in the presence of a basically reacting agent which will form salts with acids which are produced during the oxidation thus effectively removing said acids which, as indicated hereinabove, appear to be catalysts for the decomposition of peroxides. Thus by operating in the presence of such an agent we may increase the extent to which oxidation may be carried, i. e., increase the peroxide content without effecting objectionable decomposition or further oxidation of the peroxides. Agents which may be used for this purpose include the alkaline earth metals and the oxides, hydroxides and carbonates of these metals. These metals or compounds may be placed within the oxidation vessel below the level of the hydrocarbon liquid in the vessel in such a manner that they will be contacted by the liquid. Thus they may be supported on trays or the like within the body of the liquid being oxidized. Preferably the compounds are used in powder form and are dispersed in the liquid being oxidized. In using the basic compounds it is sometimes desirable to add these materials in relatively small amounts at intervals during the oxidation so that the quantity of unreacted basic compound present at any time is limited.

Instead of effecting this neutralization of acids within the oxidation chamber we may prefer in some instances to withdraw portions of the partially oxidized mixture and treat it in a separate vessel with one of the above named basic compounds, returning the deacidified oxidate to the oxidation chamber for further treatment. Thus we may continuously remove a stream of material from the oxidation chamber and pass it over a bed of one of the solid basic compounds in granular or lump form such as particles of about 10 mesh or larger, and return the contacted and washed oxidate continuously to the oxidation chamber.

It has been found that by removing acidic oxidation products in the manner described above during the period of oxidation that the rate of peroxide formation is increased and that the proportion of peroxides in the finished oxidate may be carried to an appreciably higher value without objectionable decomposition occurring.

The separation of a peroxide concentrate or of substantially pure peroxides from an oxidate comprising peroxide, unoxidized hydrocarbon and other partial oxidation products of the hydrocarbon may be effected by fractional distillation, by solvent extraction, by combinations of extraction and distillation or by chemical means, such as by treatment with an alkali, or alkaline earth metal hydroxide or carbonate or other basic compound, in which case the salt of the peroxide may be formed and separated from the hydrocarbon mixture.

Fractional distillation processes may be employed to separate peroxides from other compounds present in the oxidate because the hydroperoxides boil at temperatures at least about 175° F. above the boiling point of the hydrocarbons from which they are produced. However, distillation processes for separating the peroxides are to be used with care since the rate of decomposition of the peroxides increases markedly with an increase of temperature. The decomposition of the peroxides during the distillation can be minimized by reducing the distillation temperature as by carrying out the distillation under reduced pressure and/or in the presence of steam, and by reducing the heating time.

Other methods for the concentration and recovery of peroxides are solvent extraction or processes involving chemical reaction which processes can be carried out at relatively low temperatures and then if further purification is desired the concentrates may be distilled with steam and under vacuum and under such conditions as to reduce the time of heating necessary to complete the distillation operation. In any case when distillation processes are to be employed it is desirable that the acids present in the oxidate be removed prior to distillation for, as indicated hereinabove, these acids catalyze the decomposition of hydroperoxides and their catalytic effect increases as the temperature increases.

In separating a peroxide concentrate containing in the order of about 35% or more of peroxides from the oxidized hydrocarbon we may extract the hydrocarbon with, for example, 82% aqueous methyl alcohol, separating the aqueous alcohol phase from the hydrocarbon phase and subsequently diluting the alcohol phase with water to reject an oily layer comprising a major proportion of peroxides and minor proportions of other partial oxidation products and hydrocarbon. Instead of diluting the aqueous alcoholic phase with water, this phase may be distilled preferably under reduced pressures to vaporize the alcohol and water leaving the peroxides, other oxidation products and hydrocarbon as a bottoms fraction. In this case the bottoms fraction will be a peroxide concentrate containing about 35% by weight of peroxides. This bottoms fraction may be further fractionally distilled as, for example, at a pressure of 0.1 m. m. of mercury whereby a richer concentrate comprising peroxides is obtained.

Solvents which may be used in place of aqueous methyl alcohol for concentrating peroxides by extraction of the partial oxidation product include oxygenated organic compounds alone or in combination with various proportions of water. It is preferred that the solvent be water soluble. Compounds of this type include the aliphatic alcohols, such as ethyl, propyl, isopropyl, butyl, isobutyl, etc., the dihydroxy alcohols, such as ethylene glycol, 1,2-propanediol, 1,3-propanediol, 1,2-butanediol, 1,3-butanediol, 1,4-butanediol, 2,3-butanediol; polyhydroxy alcohols, such as glycerol; ethers and esters of di- and polyhydroxy alcohols such as ethyleneglycol monophenylether, ethyleneglycol monobenzylether, diethyleneglycol monomethylether, glycol diacetate; diketones and ketoacid esters, such as acetylacetone, methylacetyl acetate, etc.; amines such as diethylamine, trimethylamine, butylamine, aniline, diethylenetriamine, pyridine, morpholine; amides such as acetamide, formamide, diethylacidamide, etc.; amino alcohols, such as ethanolamine, diethylaminoethanol, ethylethanolamine, 2 - amino-2-methylpropanol, etc.

In a chemical method for concentrating the peroxides produced by partial oxidation of a naphthene hydrocarbon an oxidate containing about 15% by weight of peroxide is treated with aqueous sodium hydroxide containing up to about 50% by weight of NaOH at temperatures preferably in the order of atmospheric temperature or below. After thorough mixing, the treated product is allowed to settle and separate into a hydrocarbon phase and an aqueous phase which latter phase may contain a solid precipitate of the sodium salt of the peroxide, depending upon the concentration of sodium hydroxide employed. The aqueous phase is diluted with water and acidified with a mineral acid such as dilute sulfuric acid or dilute hydrochloric acid to convert the sodium salt into the hydroperoxide. The reformed hydroperoxide separates from the acidified aqueous phase as an oily layer along with other partial oxidation products and hydrocarbon. This peroxide concentrate may be fractionally distilled under vacuum to separate the peroxide in substantially pure form.

Although aqueous solutions of sodium hydroxide containing between about 5% and about 50% NaOH may be successfully employed to form the sodium salts of the hydroperoxide, we prefer to use concentrations between about 30% and about 45% by weight of NaOH for with these concentrations substantially all of the hydroperoxide which is converted into its sodium salt is insoluble in the hydrocarbon phase and only slightly soluble in the aqueous phase resulting from the extraction. The sodium peroxide salt may then be filtered or otherwise separated from the liquid materials in relatively pure form and subsequently dissolved in water and acidified with a dilute mineral acid, such as sulfuric acid, to convert the sodium salt into the hydroperoxide. The resulting hydroperoxide is relatively insoluble in the aqueous phase and forms a supernatant oily layer which may be separated from the aqueous layer by decantation. This product may be further purified if desired by fractional distillation. Peroxide concentrates produced by extraction with 30% to 45% aqueous NaOH as just described usually contain in the order of 75% by weight or more of hydroperoxides before distillation and may contain as high as 99+% by weight of hydroperoxide after careful fractional distillation under vacuum.

In addition to sodium hydroxide we may use other basic inorganic compounds to convert the hydroperoxide into its salt. Thus we may use sodium carbonate, potassium hydroxide or carbonate, lithium hydroxide or carbonate, calcium oxide or hydroxide and like compounds of magnesium, barium and strontium.

Although the peroxides produced by our process have many valuable utilizations as described hereinbelow they are of particular value in the preparation of high quality Diesel engine fuels. Diesel engines or other engines of the auto ignition type require fuels having high cetane numbers. Cetane number is related to the interval between the instant of fuel injection and the instant of ignition of the fuel in the combustion chamber of an engine and is described and defined on page 190 of the 1942 issue of the A. S. T. M. Standards on Petroleum Products and Lubricants, prepared by A. S. T. M. Committee D–2 on Petroleum Products and Lubricants. Thus ordinary high quality Diesel fuel has a cetane number of in the order of 40–47 and it is desirable in many instances to increase this value to a value between about 50 and about 55. Although by means of special refining processes, such as extraction of ordinary distilled fuel with liquid sulfur dioxide, heavy acid treatment, and the like, it is possible to obtain an increase in the cetane number of the fuel, such methods are costly and wasteful of the fuel due to the relatively high losses during such refining treatments. We have found that by adding our naphthene peroxides, naphthene peroxide concentrates or the oxidates themselves to Diesel fuels we are able to increase appreciably the cetane number of these fuels. It has been found, for example, that by the addition of an amount of peroxide concentrate equivalent to 0.3% of peroxide in the finished fuel to a Diesel fuel having a cetane number of 47.3 the cetane number is increased to 51.5 and similarly 1.07% peroxide added to the same fuel increases the cetane number to 56.6. It will be seen that additions of relatively small proportions of our peroxides cause rather large increases in the cetane number of Diesel fuels. We may use between about 0.1% and about 5.0% of the peroxides or amounts of the oxidates or the concentrates which would contain the stated amounts of peroxides.

Other uses of our peroxides are as catalytic agents in one phase or two phase polymerization processes, such as in the polymerization of butadiene and styrene in the production of synthetic rubbers, as a drying accelerator in oils, paints, varnishes, etc., as an accelerator in curing synthetic resins, as an accelerator in the vulcanization of certain synthetic rubbers, as a bleaching agent, etc. These peroxides may be used as oxidation agents and also as oxidation initiators, accelerators, or catalysts since they are found to aid in the oxidation of hydrocarbons, particularly those which do not oxidize readily in the absence of catalytic agents.

In using our peroxides as Diesel fuel additives, as oxidation agents, as catalytic agents or as initiators or accelerators, as indicated hereinabove, we may use the substantially pure peroxide separated by any of the methods described herein, we may use peroxide concentrates or we may use the oxidates directly without concentrating the peroxides therein. In some instances we may desire to prepare the substantially pure peroxides and subsequently dilute the peroxides by dissolving them in a solvent such as a hydrocarbon fraction different from the hydrocarbon or hydrocarbon fraction from which the peroxides were originally produced, in a chlorinated hydrocarbon solvent, in an oxidized or other oxygen-containing hydrocarbon solvent, in an aromatic solvent such as benzene, toluene, etc., or other solvent, depending upon the use to which the peroxides are to be put. Thus when the peroxides are to be used as Diesel fuel additives they may be first dissolved in a portion of the Diesel fuel to give a peroxide concentrate which may later be dissolved in additional quantities of the same or like Diesel fuel to produce a finished high grade fuel. Or where the peroxides are to be used as oxidation accelerators the substantially pure peroxide may be dissolved in a portion of the hydrocarbon or other compound which is to be oxidized to form a peroxide concentrate and this concentrate may then be dissolved in further quantities of said compound to produce the oxidation stock.

The following examples will serve to illustrate further our invention but are not to be taken as in any way limiting the broader aspects of our invention.

EXAMPLE I

A 2,000 ml. portion of a dimethylcyclopentane-paraffin mixture, boiling between about 194° F. and 198° F., containing about 65% by volume of dimethylcyclopentane and having a gravity of 61.7° A. P. I. was placed in a pressure vessel, heated to 265° F. and blown with air at a rate of 5 cubic feet per hour for a period of three hours. A pressure of 100 pounds per square inch gage was maintained in the oxidation vessel during the period of air blowing. Analysis of the oxidate indicated the presence of 6.6% by weight of peroxides and an acid number of 10.7 mg. of KOH per ml. The oxidized dimethylcyclopentane fraction was cooled to atmospheric temperature and removed from the oxidation unit.

A portion of the oxidate was treated for the recovery of peroxides in the following manner: A 100 ml. portion was extracted twice with 15 ml. portions of 18% aqueous sodium hydroxide at a temperature of 41° F. The extracts were combined, diluted with 100 ml. of water and neutralized with 75 ml. of 10% sulfuric acid. An oily layer separated from the diluted and acidified aqueous layer and this oily layer was found to have a peroxide content, calculated as dimethylcyclopentyl hydroperoxide, of 62% by weight.

EXAMPLE II

A 19 gallon portion of a dimethylcyclopentane-rich gasoline fraction containing 65% by volume of dimethylcyclopentanes and having a boiling range of 194° F. to 198° F. to which was added a small amount of a peroxide concentrate so that the resulting blend had a peroxide content of 0.19% by weight was oxidized at a pressure of 85 to 90 pounds per square inch gage and a temperature of 270° F. to 275° F. using an air rate 500 cubic feet per hour for a period of 1.67 hours. The oxidation was discontinued at this time and the product was cooled and withdrawn from the oxidation vessel. This oxidate had a peroxide content, calculated as dimethylcyclopentyl peroxide, of 4.2% by weight and an acid number of 2.5 mg. KOH/ml.

To 17.5 gallons of oxidate containing 4.2% by weight or 2,000 grams of peroxide was added one gallon of 40% by weight NaOH and the mixture thoroughly agitated at about 70° F. After standing approximately one hour to allow phase separation, 10 gallons of hydrocarbon layer was decanted. This layer contained 0.6% by weight or 170 grams of peroxides. The aqueous phase consisting of a mixture of solid precipitate and an emulsion of hydrocarbon oil and water was diluted with 2 gallons of water and thoroughly agitated. On standing an additional 5 gallons of hydrocarbon oil was separated which contained 2% by weight or 281 grams of peroxides. The aqueous layer comprising a solution of the sodium salt of the hydroperoxides in water was acidified with 3 gallons of 10% sulfuric acid. After thorough mixing the acidified product was allowed to stand and 800 grams of an oily layer containing 81% by weight or 648 grams of peroxides was obtained.

EXAMPLE III

A 2,000 ml. portion of dimethylcyclopentane-paraffin mixture boiling between about 194° F. and 198° F. and having a gravity of 61.7° A. P. I. to which had been added 3% by weight of dimethylcyclopentyl hydroperoxide was oxidized for a period of 4.5 hours at 240° F. and 100 pounds per square inch pressure using an air rate of 5 cubic feet per hour. The oxidate contained 10% by weight of peroxide and had an acid number of 10.0 mg. KOH/ml. A portion of the oxidate was treated with 38% NaOH solution and the resulting precipitate of the sodium salt of dimethylcyclopentyl hydroperoxide was separated by filtration. This salt was dissolved in water and acidified with 10% sulfuric acid. The dimethyl cyclopentyl hydroperoxide, which separated as an oily layer, was distilled at a pressure of 0.1 m. m. mercury to produce a substantially pure compound having the formula $(CH_3)_2C_5H_7.OOH$

Example IV

A 1500 ml. portion of substantially pure methylcyclohexane having a gravity of 51.8° A. P. I. was oxidized for a period of six hours at a temperature of 275° F. and a pressure of 100 pounds per square inch gage using an air rate of 5 cubic feet per hour. The product contained 8.7% by weight of peroxides calculated as methylcyclohexyl hydroperoxide and had an acid number of 4.2 mg. KOH/ml.

The oxidate was treated with 38% NaOH. The sodium salt of the hydroperoxide filtered from the liquid mixture, dissolved in water and acidified with dilute sulfuric acid. The oily layer which separated from the acidified aqueous solution was distilled under a pressure of 0.1 mm. of mercury to produce a substantially pure methylcyclohexyl hydroperoxide having the formula $CH_3.C_6H_{10}.OOH$.

Example V

A 1293 ml. portion of technical methylcyclopentane (approximately 95% purity) having a gravity of 57.1° A. P. I. was oxidized for a period of four hours at a temperature of 260° F. and a pressure of 100 pounds per square inch gage using an air rate of 5 cubic feet per hour. The oxidate contained 6.7% by weight of methylcyclopentyl hydroperoxide and had an acid number of 6.7 mg. KOH/ml.

A substantially pure hydroperoxide having the formula $CH_3.C_5H_9.OOH$ was separated from this oxidate in a manner similar to that employed in Examples III and IV.

Example VI

In order to show the effect of peroxides as oxidation initiators or accelerators two portions of a commercial isooctane were oxidized under the conditions shown in the following tabulation. To one of the portions of the isooctane was added 1.34% by weight of dimethylcyclopentyl hydroperoxide as an oxidation accelerator. The rate of oxidation was determined in each case by titration of samples of the oxidate with potassium hydroxide and also by analysis of the oxygen content of the spent air leaving the oxidation unit. These data, which are also included in the tabulation, show that oxidation occurs far more rapidly when the naphthene peroxide is employed:

*Oxidation of isooctane*

| | Without Peroxides | With Peroxides |
|---|---|---|
| Isooctane, ml | 1,500 | 2,000 |
| Peroxide content, per cent by weight | 0 | 1.34 |
| Temperature, °F | 300 | 275 |
| Pressure, lbs./sq. in. gage | 70 | 100 |
| Air rate, cubic feet per hour | 5 | 5 |
| Acid number of oxidate, mg. KOH/ml. after— | | |
| 60 minutes | 0.2 | 2.3 |
| 120 minutes | 0.3 | 6.5 |
| Oxygen in spent air, per cent, after— | | |
| 45 minutes | | 18 |
| 60 minutes | 20.5 | |
| 75 minutes | | 7.3 |
| 95 minutes | | 9.2 |
| 120 minutes | 20.7 | |

The foregoing description and examples of our invention are not to be taken as limiting since many variations may be made by those skilled in the art without departing from the spirit or the scope of the following claims.

We claim:

1. A substantially stable water-insoluble saturated cyclic hydrocarbon hydroperoxide having the formula R.OOH, where R is a cyclopentyl group containing at least one methyl group and not more than two methyl groups.

2. A substantially stable water-insoluble saturated cyclic hydrocarbon hydroperoxide having the formula R.OOH, where R is methyl cyclopentyl.

3. A substantially stable water-insoluble saturated cyclic hydrocarbon hydroperoxide having the formula R.OOH, where R is dimethyl cyclopentyl.

ADALBERT FARKAS.
ARTHUR F. STRIBLEY, Jr.

REFERENCES CITED

The following references are of record in the file of this patent:

UNITED STATES PATENTS

| Number | Name | Date |
|---|---|---|
| 2,092,322 | Moser (I) | Sept. 7, 1937 |
| 2,240,145 | Moser (II) | Apr. 29, 1941 |
| 1,689,599 | Ramage | Oct. 30, 1928 |
| 2,176,407 | Milas | Oct. 17, 1939 |
| 1,924,786 | Hartmann | Aug. 29, 1933 |
| 2,270,175 | Tadema | Jan. 13, 1942 |
| 335,962 | Schaal | Feb. 9, 1886 |

FOREIGN PATENTS

| Number | Country | Date |
|---|---|---|
| 346,520 | Germany | Jan. 2, 1922 |

OTHER REFERENCES

Ellis, "The Chemistry of Petroleum Derivatives," vol. II, pp. 852, 854, 855, Reinhold, New York, 1937.